US012585622B2

(12) United States Patent
Reid et al.

(10) Patent No.: US 12,585,622 B2
(45) Date of Patent: Mar. 24, 2026

(54) METHODS AND SYSTEMS PROVIDING NFT CHARACTERS ON A BLOCKCHAIN

(71) Applicant: One Earth Rising P.B.C., New York, NY (US)

(72) Inventors: Sean Reid, Toronto (CA); Luc Bernard, Los Angeles, CA (US)

(73) Assignee: One Earth Rising P.B.C., New York, NY (US)

( * ) Notice: Subject to any disclaimer, the term of this patent is extended or adjusted under 35 U.S.C. 154(b) by 168 days.

(21) Appl. No.: 18/219,565

(22) Filed: Jul. 7, 2023

(65) Prior Publication Data

US 2024/0012794 A1     Jan. 11, 2024

Related U.S. Application Data

(60) Provisional application No. 63/359,689, filed on Jul. 8, 2022.

(51) Int. Cl.
| | |
|---|---|
| *A63F 13/60* | (2014.01) |
| *A63F 13/77* | (2014.01) |
| *G06F 16/18* | (2019.01) |

(52) U.S. Cl.
CPC .......... *G06F 16/1865* (2019.01); *A63F 13/60* (2014.09); *A63F 13/77* (2014.09)

(58) Field of Classification Search
CPC ................................. A63F 13/60; A63F 13/63
See application file for complete search history.

(56) References Cited

U.S. PATENT DOCUMENTS

| | | | |
|---|---|---|---|
| 11,741,426 B2 | 8/2023 | Stephens et al. | |
| 12,154,666 B2* | 11/2024 | Kruger | G06Q 20/363 |
| 2020/0175001 A1* | 6/2020 | Malan | G06Q 20/401 |
| 2022/0347578 A1* | 11/2022 | Cunningham | A63F 13/73 |
| 2023/0042269 A1* | 2/2023 | Benedetto | A63F 13/79 |
| 2023/0079127 A1* | 3/2023 | Benedetto | A63F 13/69 |
| 2023/0090253 A1* | 3/2023 | Meadows | H04L 67/12 |
| | | | 345/419 |
| 2023/0119641 A1* | 4/2023 | Meyers | H04L 9/50 |
| | | | 463/42 |
| 2023/0125021 A1* | 4/2023 | Meyers | A63F 13/822 |
| | | | 463/31 |
| 2023/0377056 A1* | 11/2023 | Yang | A63F 13/63 |
| 2025/0046041 A1* | 2/2025 | Takei | G06T 19/20 |

* cited by examiner

*Primary Examiner* — Jay Trent Liddle
(74) *Attorney, Agent, or Firm* — Wiggin and Dana LLP

(57)     ABSTRACT

Methods and systems for providing characters on a blockchain as NFTs are provided. A character NFT may include one or more skeletal structures, one or more skins, and/or one or more animations. A character NFT may be advantageously utilized in cross-platform applications.

20 Claims, 20 Drawing Sheets

The Full Purposeverse™ with NFT+ & Game Development SDK

FIG. 11

METHODS AND SYSTEMS PROVIDING NFT CHARACTERS ON A BLOCKCHAIN

CROSS-REFERENCE TO RELATED APPLICATION

This application claims priority to U.S. provisional application No. 63/359,689, filed Jul. 8, 2022, which is hereby incorporated by reference in its entirety.

TECHNICAL FIELD

Methods and systems for providing characters on a blockchain as NFTs are provided. A character NFT may include one or more skeletal structures, one or more skins, and/or one or more animations. A character NFT may be advantageously utilized in cross-platform applications, including video games.

BACKGROUND

Blockchain technologies have become a widespread framework for secure handling of information, including so-called digital assets. The blockchain, alternatively called distributed ledger technology (DLT), is a decentralized, distributed ledger that contains an immutable record of an asset including aspects such as ownership, sales, etc. This is in contrast to standard databases in which the history of an asset may be altered or even deleted, in which securely establishing asset ownership more difficult, and in which ownership of the data records is centralized and often owned and maintained by a single gatekeeper.

Blockchain technologies have enabled the use of non-fungible tokens (NFTs) as securities inextricably linked with digital data stored in the blockchain. For example, an NFT may contain a reference to a digital file such as an image file, an audio file, or a video file, the reference publicly establishing proof of ownership and authenticity.

The non-fungible aspect of NFTs means that the digital token referencing the digital asset is unique. By contrast, fungible assets like fiat currency are non-unique and exchangeable one for one. (e.g., a dollar bill may be exchanged for another dollar bill). In the art and collectibles space, NFT assets are unique assets (i.e., referencing ownership of a particular JPEG or GIF file, or containing a particular file) and, just as with a painting, a party may hold digital and publicly verifiable proof of title to that original digital asset, such as an image file, by way of example. At this time, file types that may be used with NFTs include JPG, PNG, GIF, SVG, MP4, WEBM, MP3, WAV, OGG, GLB, and GLTF. Theoretically, however, any digital file can be "tokenized" as an NFT.

Despite these clear distinctions and advantages over existing marketplaces, NFT technologies are nascent and have many unexplored applications. For example, some experts in the field may cast doubt on utility of NFTs beyond transactions involving a simple image, such as the "Bored Ape" NFTs or other various examples. Additionally, the blockchain environment is a complex ecosystem involving various marketplaces, currencies, etc. and there remains a great need for new implementations of blockchain technologies which allow end users to securely purchase and utilize NFT assets in more complex settings and applications beyond, for instance, the simple viewing of an owned photograph or playback of an owned audio file.

One such unexplored implementation of blockchain technologies is for ownership of a video game avatar or character as an NFT. Some have touted one theoretical advantage of NFTs and the digital/online space loosely referred to as "the metaverse" as allowing for the storage of video game avatar or character characteristics or accessories on a blockchain, which could enable those characters or their accessories to be moved across different platforms and video games. In reality, doing this is extremely complicated and to date has not been achieved. The prevailing state of known technologies, in some aspects, suggests that such ownership might only be achievable for, as an example, an image representation of a character rather than the character itself. This would raise a serious and complicated ownership question as to what aspects of the character actually belong to the user. Furthermore, the image representation NFT would not be usable to provide for a character representation in a video game or other application because various aspects of the character appearance would need to be provided by the video game or application.

The present disclosure solves this problem and encompasses methods and systems for providing a character, or any other in-game assets, as an NFT, including one or more skeletal structures, one or more skins, and/or one or more animations/poses. In various embodiments, the NFT character may be utilized in one or more video games or applications and may further be useful for cross-platform play. Furthermore, the NFT characters may be associated with additional attributes such as experience, which enables a user to increase the value of their NFT character during use. Such implementations may extend beyond video game characters and may be relevant to other avatars, animated logos, or any construct representable or constituted by skeleton structures, skins, and/or animations/poses.

SUMMARY

Embodiments of the present disclosure generally relate to methods and systems for NFT assets. In various embodiments, the methods and systems are useful for providing NFT characters, such as video game characters, avatars, etc., as an NFT for cross-platform use of the NFT. Various implementations of the embodiments described herein should be apparent, and additional embodiments within the scope and spirit of the invention are contemplated.

In an embodiment, the present disclosure provides for a method of providing a character as a non-fungible token (NFT) comprising:

- providing a skeletal structure for a character;
- mapping a skin to the skeletal structure;
- defining a plurality of animations, wherein each animation is a manipulation of the skeletal structure;
- packaging the skeletal structure, skin, and animations into a filesystem;
- creating an image file having a plurality of data chunks;
- storing the filesystem on one or more chunks of the image file; and
- minting an NFT corresponding with the image file on a blockchain.

In an embodiment, the method further comprises storing a static image of the character in the image file.

In an embodiment, the static image is displayed when the image file is opened in a photo viewer.

In an embodiment, the image file is a PNG file.

In an embodiment, the top-level asset on the blockchain is a PNG file.

In an embodiment, the present disclosure provides for a method of providing a character as a non-fungible token (NFT) comprising:

packaging a skeletal structure of the character, a skin associated with the skeletal structure, and animations of the skeletal structure into a filesystem;

storing the filesystem on one or more chunks of an image file; and minting an NFT corresponding with the image file on a blockchain.

In an embodiment, the present disclosure provides for a system comprising:

a blockchain, an image file minted on the blockchain as a non-fungible token (NFT) comprising:

a plurality of data chunks;

a filesystem stored on one or more of the plurality of data chunks, wherein the filesystem comprises a skeletal structure of an NFT character, a skin associated with the skeletal structure, and animations of the skeletal structure; and a static image of the NFT character, and a client interfaced with the blockchain.

In an embodiment, the client is a web browser, mobile device, or video game console.

In an embodiment, the client is a video game console and wherein the system further comprises a server.

In an embodiment, the server accepts an HTTP request from the video game console and executes computer readable instructions to retrieve the image file minted on the blockchain.

In an embodiment, the image file is a PNG.

In an embodiment, the present disclosure provides for a system for cross-platform use of a non-fungible token (NFT) character comprising:

a first client program operating on a first client;

a second client program operating on a second client;

a server in communication with the first and second clients and a blockchain;

a NFT character stored within a PNG image file, the image file corresponding to an NFT minted on the blockchain;

wherein the NFT character is usable in each of the first and second client programs.

In an embodiment, the first and second clients are each independently selected from a video game console, a mobile device, and a computer browser.

In an embodiment, the first and second clients are the same, or different.

In an embodiment, the present disclosure provides for a system for cross-platform use of a non-fungible token (NFT) character comprising:

a first client program operating on a first client;

a second client program operating on a second client;

an NFT character stored within an image file, the NFT stored in a user's digital wallet, and the image file corresponding to an NFT minted on a blockchain; and a server comprising:

a data store comprising:

login credentials for a user;

an association between the login credentials and the user's digital wallet; and computer readable instructions for obtaining the NFT character from the blockchain in response to a request from the first or second clients; and a processor for executing the computer readable instructions, wherein the NFT character obtained from the blockchain is usable in each of the first and second video client programs.

In an embodiment, the data store further comprises authentication logic executable by the processor for authenticating the user login on each of the first and second clients.

In an embodiment, the data store further comprises one or more pieces of stored data specific to an NFT character, selected from an attribute, an experience (XP) level, and transaction history.

In an embodiment, the first and second clients are each independently selected from a video game console, a mobile device, and a computer browser.

In an embodiment, the present disclosure provides for methods for cross-platform use of a non-fungible token (NFT) character comprising:

accessing a blockchain-enabled server by inputting user credentials at a first client;

receiving, from a blockchain or the blockchain-enabled server, an image file corresponding with an NFT character;

incorporating the NFT character in a first client program running on the first client;

accessing a blockchain-enabled server by inputting user credentials at a second client;

receiving, from a blockchain or the blockchain-enabled server, an image file corresponding with an NFT character; and incorporating the NFT character in a second client program running on the second client.

In an embodiment, the present disclosure provides for a method for cross-platform use of a non-fungible token (NFT) character comprising:

accessing a blockchain-enabled server by inputting user credentials at a first client;

receiving, from a blockchain or from the blockchain-enabled server, an image file corresponding with an NFT character;

loading one or more NFT character attributes from the server or blockchain;

incorporating the NFT character in a first client program running on the first client, whereby one or more of the NFT character attributes are updated;

saving one or more updated NFT character attributes to the server or blockchain;

accessing a blockchain-enabled server by inputting user credentials at a second client;

receiving, from a blockchain or from the blockchain-enabled server, an image file corresponding with an NFT character;

loading the one or more updated NFT character attributes from the server or blockchain; and incorporating the NFT character and updated NFT character attributes in a second client program running on the second client.

In an embodiment, the disclosure provides for a method of providing a video game character as a non-fungible token (NFT) comprising:

providing a skeletal structure for a character;

mapping a skin to the skeletal structure;

defining a plurality of animations, wherein each animation is a manipulation of the skeletal structure;

packaging the skeletal structure, skin, and animations into a filesystem;

creating an image file having a plurality of data chunks;

storing the filesystem on one or more chunks of the image file; and minting an NFT corresponding with the image file on a blockchain.

In a further embodiment, methods of providing a video game character as a non-fungible token (NFT) comprise:

packaging a skeletal structure of the character, a skin associated with the skeletal structure, and animations of the skeletal structure into a filesystem;

storing the filesystem on one or more chunks of an image file; and minting an NFT corresponding with the image file on a blockchain.

In some embodiments, methods of providing a video game character as a non-fungible token (NFT) comprise storing a static image of the character in the image file.

In some embodiments the static image is displayed when the image file is opened in a photo viewer.

In some embodiments the image file is a PNG file.

In some embodiments the top-level asset on the blockchain is a PNG file.

In a further embodiment, the disclosure provides for a system comprising:

a blockchain, an image file minted on the blockchain as a non-fungible token (NFT) comprising:

a plurality of data chunks;

a filesystem stored on one or more of the plurality of data chunks, wherein the filesystem comprises a skeletal structure of a video game character, a skin associated with the skeletal structure, and animations of the skeletal structure; and a static image of the video game character, and a client interfaced with the blockchain.

In some embodiments, the client is a web browser, mobile device, or video game console.

In some embodiments, the client is a video game console and wherein the system further comprises a server.

In some embodiments, the server accepts an HTTP request from the video game console and executes computer readable instructions to retrieve the image file minted on the blockchain.

In some embodiments, the image file is a PNG.

In a further embodiment, the disclosure provides for a system for cross-platform use of a non-fungible token (NFT) video game character or other NFT character comprising:

a first video game (or other client program) operating on a first client;

a second video game (or other client program) operating on a second client;

a server in communication with the first and second clients and a blockchain;

a NFT video game character stored within a PNG image file, the image file corresponding to an NFT minted on the blockchain;

wherein the NFT video game character is playable in each of the first and second video games.

In some embodiments, the first and second clients are each independently selected from a video game console, a mobile device, and a computer browser.

In some embodiments, the first and second clients are the same, or different.

In a further embodiment, the disclosure provides for a system for cross-platform use of a non-fungible token (NFT) video game character or other NFT character comprising:

a first video game (or other client program) operating on a first client;

a second video game (or other client program) operating on a second client;

an NFT video game character stored within an image file, the NFT stored in a user's digital wallet, and the image file corresponding to an NFT minted on a blockchain; and a server comprising:

a data store comprising:

login credentials for a user;

an association between the login credentials and the user's digital wallet; and computer readable instructions for obtaining the NFT video game character from the blockchain in response to a request from the first or second clients;

a processor for executing the computer readable instructions, wherein the NFT video game character obtained from the blockchain is playable in each of the first and second video games.

In some embodiments, the data store further comprises authentication logic executable by the processor for authenticating the user login on each of the first and second clients.

In some embodiments, the data store further comprises one or more pieces of stored data specific to an NFT character, selected from an attribute, gained experience, an experience (XP) level, and transaction history.

In some embodiments, the first and second clients are each independently selected from a video game console, a mobile device, and a computer browser.

In a further embodiment, the disclosure provides for a method for cross-platform use of a non-fungible token (NFT) video game character comprising:

accessing a blockchain-enabled server by inputting user credentials at a first client;

receiving, from a blockchain or the blockchain-enabled server, an image file corresponding with an NFT video game character;

playing a video game on the first client incorporating the NFT video game character;

accessing a blockchain-enabled server by inputting user credentials at a second client;

receiving, from a blockchain or the blockchain-enabled server, an image file corresponding with an NFT video game character; and playing a video game on the second client incorporating the NFT video game character.

In a further embodiment, the disclosure provides for a method for cross-platform use of a non-fungible token (NFT) video game character comprising:

accessing a blockchain-enabled server by inputting user credentials at a first client;

receiving, from a blockchain or from the blockchain-enabled server, an image file corresponding with an NFT video game character;

loading one or more NFT video game character attributes from the server;

playing a video game on the first client incorporating the NFT video game character, wherein the playing results in one or more of the NFT video game character attributes being updated;

saving one or more updated NFT video game character attributes to the server;

accessing a blockchain-enabled server by inputting user credentials at a second client;

receiving, from a blockchain or from the blockchain-enabled server, an image file corresponding with an NFT video game character;

loading the one or more updated NFT video game char-
acter attributes from the server; and
playing a video game on the second client incorporating
the NFT video game character and its updated attri-
butes.

In some embodiments, the attribute is an experience (XP)
level.

In some embodiments, the first and second clients are
each independently selected from a video game console, a
mobile device, and a computer browser.

BRIEF DESCRIPTION OF THE DRAWINGS

FIG. 11 shows an exemplary overall diagram for the user
platform;

DETAILED DESCRIPTION

Figure 1:
FIG. 1 depicts an exemplary texture sheet for a first
frog-like character.

The present disclosure encompasses methods and systems
for providing a character as an NFT, including one or more
skeletal structures, one or more skins, and/or one or more animations/poses. The NFT may further advantageously
contain a pre-rendered flat image of the character for iden-
tification purposes. While this concept in and of itself is
inventive, certain technical challenges exist for which the
present disclosure provides exemplary solutions.

As used herein, the term "character" is non-limiting and
inclusive of other in-game assets which may be provided in
an NFT, as disclosed herein. For example, characters, ava-
tars, weapons, vehicles, logos, usable in-game items (e.g.
portions, attribute boosters, etc), or any other in-game asset.

Prevailing knowledge in the field of NFTs suggests that
NFTs extending beyond simple images or audio files, etc. are
not achievable, in part, due to current limitations of usable
file types such as JPG, PNG, GIF, SVG, MP4, WEBM, MP3,
WAV, OGG, GLB, and GLTF. Additionally, the process of
creating NFTs is costly and it is advantageous to incorporate
an NFT character as a single NFT, as opposed to multiple
NFTs. Such cost is linked with power demands and use of
valuable fossil fuel resources (i.e. NFT "gas fees"), and thus
any additional costs are not simply economic and also have
deleterious environmental and infrastructure effects. Numer-
ous NFTs to represent a character, in addition to wasting
resources, would further present challenges for interfacing
with video games and/or other applications NFT "minting" (i.e. creating an NFT on a blockchain)
follows some general steps which may vary as would be
appreciated by a person of skill in the art. A digital asset
must generally be prepared by the originator and then stored
in such a manner that it will be accessible to the originator
and future owner(s). A digital wallet capable of interacting
with the blockchain is also required which will contain
cryptocurrency and the NFT once it is minted. The originator
may choose a price, royalties, number of tokens which may
be issued for the NFT, and which token standard the NFT
will utilize (e.g. ERC-721, ERC-1155, ERC-721, or any
other known token standard). The originator then mints the
token(s) and pays a gas fee to interact with the blockchain.
Once minted, the originator may choose to sell the NFT. A
buyer, also having a digital wallet capable of interacting with
the blockchain, may purchase an NFT asset from the origi-
nator/seller by paying for the NFT and also by paying a gas
fee for interacting with the blockchain. Once the transaction
is complete, the NFT transfers to the buyer's digital wallet.
Various NFT steps and modalities for minting, selling,
buying, etc. are contemplated by the present disclosure so
long as the NFT is compatible with blockchain transactions.

As described herein, an avatar or video game character
may include various aspects. One such aspect is one or more
skeletal structures defining the overall shape or body of the
character. The skeletal structure may be described as various
interrelated units which may be adorned with further tex-
tures, such as skins, and/or may be manipulated to represent
movement, such as in various animations or poses. Charac-
ters having differing shapes may have differing skeletal
structures—for instance a skeleton of a frog-like character
may differ substantially from that of a snake-like character,
or a humanoid character. Likewise, the skins for such
characters will vary greatly as will their animations/poses. In
order to accurately represent the character, it is therefore
important that these aspects (skeletal structure, skins, and
poses/animations) are available and accessible for rendering
in an application or video game environment.

In typical video game environments, these aspects of the
character would be hard-loaded into a video game and
would not be exportable to a marketplace, much less usable in another video game. In other words, they are not cross-platform compatible nor are they generally compatible for any external marketplace.

Furthermore, any transactions that players might engage in with respect to characters, collectibles, etc., such as in-game trades or in-game trades in conjunction with an external transfer of funds, are not secure and do not confer title of ownership to the player receiving the trade. Of further importance, typical in-game collectibles or purchases might have a certain rarity, or difficulty/probability in obtaining such items via drops or other mechanisms which award an item to a player based upon chance, but do not have inherent scarcity which is conferred by minting on the blockchain—the originator may choose to only mint or release a certain number of an item to define its scarcity and, in part, its value.

NFT+ (or OGA)

The present disclosure is directed to NFT+, a term which represents the concepts disclosed herein including "NFT characters". NFT+ may be alternatively referred to as OGA, meaning Ownable Game Asset. NFT+ differs from standard NFT in that standard NFT is limited to an image, video, or audio. NFT+ enables an NFT character to be provided on the blockchain and to be utilized in various games and/or applications. As described herein an NFT character is not limited to being an image, video, or audio and rather includes a skeletal structure, skins, and/or poses/animations. The NFT+, or NFT character, therefore represents a full representation of the character's shape, appearance, and poses/animations such that they can be rendered in-game based upon the actual information stored on the blockchain. For the sake of efficiency, the term "NFT" as used herein includes "NFT+" and "OGA" unless the context clearly dictates otherwise.

Another advantage to NFT+ is that it enables users to import characters into a game in which they were never compiled. The NFT+ carries the necessary information to fully render the character in-game, including its animations and poses, while the game provides for how the character interacts with the environment around it. This characteristic provides for further opportunities for users to be able to design their own characters and utilize them in games for which the characters and components of the characters (such as skins, animations, etc.) were never compiled. This aspect avoids costly and time-consuming updates to incorporate new characters and, as discussed further herein, lends itself to cross-game and cross-platform utilities.

NFT+ may be utilized by any appropriate game engine. For example, a game engine may have a miniature version that works in HTML via JavaScript. Rather than using binary files (called .pcd) in the C++ game engine for use on game consoles, an alternative JSON text file format may be used. There are three types of game engine data that are generally used to present a 2D animated skeleton:

1) Imagemap: associated with an image file (such as a PNG image), and contains rectangular position and sizes to cut-up the character textures 2) Skinset: a mapping of Imagemap rectangular cut-outs to Skeleton bones by name and 3) Skeleton: the skeletal animation definition including bones, poses, key-frames, and animations.

Figure 2:
FIG. 2 depicts an exemplary texture sheet for a second
frog-like character.

FIG. 1 and FIG. 2 show exemplary texture sheets for a frog-like character. In some embodiments, it is desirable for the NFT asset to be a singular file and stored on a decentralized location such as IPFS (InterPlanetary File System). It should be appreciated that use of IPFS is non-limiting and any useful technologies for storing the OGA on a blockchain for access by a client is contemplated. For example, an OGA may be stored directly on a blockchain rather than in a different distributed file storage location. An exemplary blockchain useful for storing a full OGA is the Skale blockchain. In an embodiment, a smart contract is stored on a blockchain and the OGA is stored in another distributed file storage location. It should be appreciated that IPFS is only an exemplary decentralized location, and any other blockchain-compatible technologies for storage and access of digital assets are contemplated.

In an alternative embodiment, at least one aspect of the OGA is stored on the blockchain directly. In an embodiment, the entire OGA is stored on the blockchain directly. In an embodiment, the entire OGA is stored on the blockchain directly along with one or more attributes associated with the OGA. In yet further embodiments, an asset originally stored on a decentralized location (e.g. IPFS or others) or on a blockchain is downloaded or transferred to the user platform (i.e. a blockchain-enabled server) as described herein for use in a client program running on a client (such as a video game running on a video game platform). In this manner, while the blockchain may be used to confirm ownership/provenance, the user platform may utilize a server copy of the user-owned NFT character image file for loading into client programs on various clients from which a user has logged into the user platform via their user account.

Figure 3:
FIG. 3 shows a PNG file of the second frog-like character,
with the file containing the underling NFT character.
Figure 4:
FIG. 4 shows an exemplary frog-like character utilizing
aspects of each of the texture sheets for the first and second
frog-like characters.
Figure 5:
FIG. 5 shows an exemplary frog-like character utilizing
aspects of each of the texture sheets for the first and second
frog-like characters.

FIG. 3, for example, is a character having the texture sheet of FIG. 2. The texture sheets (i.e. skins) can also be mixed-and-matched to generate various permutations of characters. FIGS. 4 and 5 show examples of the frog-like character having mixed-and-matched skins from portions of each of FIGS. 1 and 2. In an embodiment, an NFT character may be constructed from one or more skins, i.e. a mixture of aspects of more than one skin. Skins or mixtures of skins may be designed or generated randomly when the NFT character is initially designed and before it is minted on the blockchain.

When generating or designing an NFT character, the skin is generally mapped to a skeletal structure. In this context, the "skin" may be a single skin or any mixture of skins (such as mixtures of pieces from various texture sheets for the same skeletal structure). Therefore, a mix-and-match approach is contemplated when a skin is mapped to a skeletal structure. These events occur before the NFT character is minted, after which the particular skin is typically permanent. It is contemplated that a single NFT character file may contain more than one skin or may contain a collection of skins, in certain embodiments.

NFT+ Filesystem

NFT+ (i.e. OGA) incorporates NFT character aspects, including its skeletal structure, skins and/or poses/animations, into an image file format in such a manner that the full character may be rendered by a game or program configured to do so. In an embodiment, the image file is a Portable Network Graphics (PNG, or .png) file. In alternative embodiments, the image file is any appropriate type of image file, including but not limited to, TIFF, Bitmap, JPEG, GIF, EPS, RAW, or any raster or vector image file. A PNG file is typically known a raster-type graphics file supporting lossless data compression and which does not allow for animations. The present disclosure includes the surprising discovery that chunks within an image file, for example a PNG file, can be utilized to include an NFT character, i.e. NFT+.

Because the file is an image file, or a PNG file, the top-level asset is the image file which is compatible to be provided on the blockchain. Furthermore, in some embodiments, the character can be viewed in a standard image viewer as a "static" image, or can be animated in a suitable application or platform utilizing the animations contained within the image file.

As an example, the following data may be stored on a singular file on the IPFS or on a blockchain:

A pre-rendered flat image of a character.

Game engine data that defines a 2D skeletal animation of a character.

Character texture sheets of all possible "skins", i.e. textures

The disclosed solution to store all of this in a single file is to make use of the PNG file format which supports custom data chunks. The PNG file format itself stores its pixel data, palettes, and other metadata into its defined system of chunks. A chunk is just a named blob of binary data. Anyone is allowed to make a new chunk for custom use.

A file format is defined for the game engine which allows for packaging of game engine data into a single file. This file also allows to store any binary data type which allows to store the multiple skin textures, skeletal structure, animations, etc. This file, comprising binary data, is stored it into a pre-rendered version of the critter's PNG as a custom data chunk. This means the NFT+ asset will present itself as a PNG, but it contains all of the necessary data to display it as animated. FIG. 3 depicts a PNG file containing the NFT+ character based upon the texture sheets of FIG. 2.

Game Engine JavaScript Library

This is a single file script that can be included into any web page or compatible platform. For example, a file called "gameengine.min.js" which is a single JavaScript file that also contains dependent libraries such as Mersenne Twister random number generator and zlib decompression, may be provided.

Once this file is included into a users' page, they just need to call a simple function to load an NFT+, or NFT character, from the IPFS or directly from a blockchain and it will be presented as animated. All of the necessary functions are there to change the character's animation based upon the animations stored within the NFT PNG file.

In further embodiments, a blockchain asset scanner (as a non-limiting example, an Ethereum asset scanner) can include this freely available mini JavaScript library, and a user will be able to not only show the character from the blockchain, but show it as fully animated. A user can even integrate a drop-list of available animations and any user can change it to view it. Also, other sites and/or game projects can make use of the library to integrate the characters in their own games.

And, in the event that a blockchain asset scanner site does not implement the JavaScript library, the asset itself will be the pre-rendered PNG, which further contains the necessary information to bring the character "to life". A further advantage is that the NFT character presents itself as a standard PNG file, so the asset can be viewed and identified to an extent even if the platform viewing the NFT is not capable of utilizing the JavaScript library.

User Platform

NFT+ stands on its own to provide an NFT character (OGA) on the blockchain. Using the character in-game then requires an appropriate game engine to render and utilize the character based upon the NFT+ data, as would be appreciated by a person of skill in the art. NFT+ further provides for an unprecedented opportunity to utilize NFT characters in multiple games, or cross-platform. The term "cross-platform" as utilized herein may encompass an NFT character being utilizable on a first platform, such as a web browser, and on a second platform, such as a video game console (Xbox, PlayStation, etc.), a mobile phone (iOS, Android, etc.), or other platform. The game in which the character is utilized across the first and second platforms may be the same game or may be a different game. The term "cross-platform" is therefore also intended to be inclusive of the character being utilizable in multiple games, whether they are on the same platform or different platforms.

Figure 6:
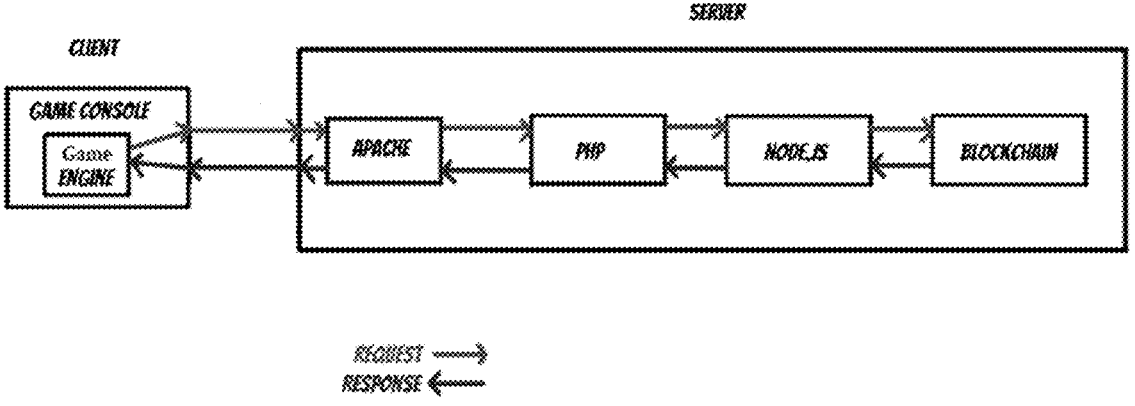
FIG. 6 shows an exemplary diagram of a game console
accessing the blockchain.
Figure 7:
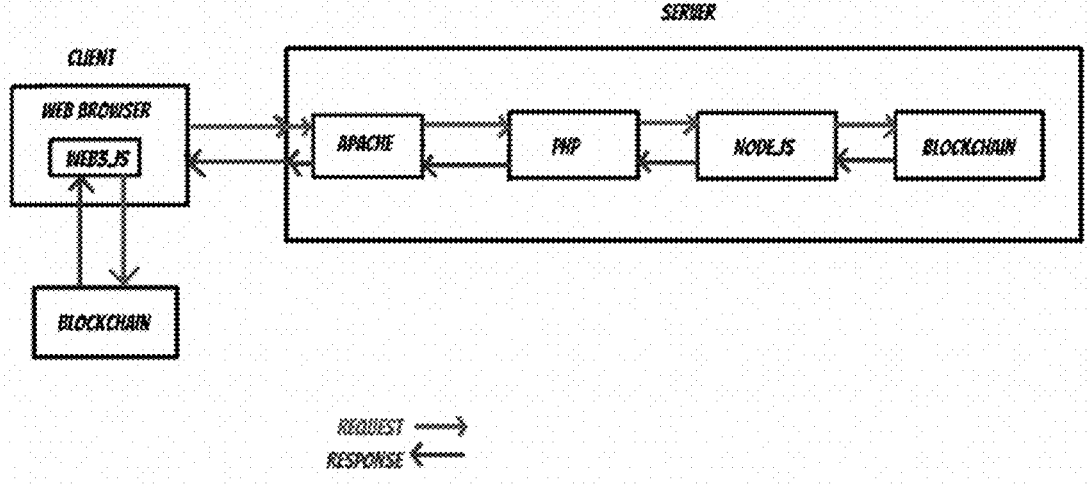
FIG. 7 shows an exemplary diagram of a web browser
accessing the blockchain.

FIG. 6 depicts an exemplary diagram of a game console (Xbox, PlayStation, etc.) interacting with a server to access the blockchain, to obtain the NFT character, confirm ownership of the NFT character, etc. Game consoles do not have native support for the blockchain at this time. Therefore, the server acts as an intermediary for the game console to access the blockchain. However, the server must also be configured to access the blockchain based upon the virtual wallet of the user and based upon the user's login input at the game console. This is achieved by a single login to a user platform system The user platform includes, for a given user, a user account which is a single login from a game console, computer, web browser, etc. which provides access to the user's digital wallet, including their NFT characters, and which also may provide for storage and retrieval for various attributes of NFT characters owned by user. For clarity, it is noted that such stored attributes associated with the NFT character are not a required feature, but provide for certain advantages as described herein. The client platform may be described as a system providing one or more of: a user login at a game console or other platform such as a web browser; user credentials for the login and associated with the user's digital wallet; optional authentication features for which a user may input biometric authentication, two-step authentication, etc.; a server for accessing the user's digital wallet and for communicating between the game console or other platform and the blockchain, the server configured to access the user's NFT characters and provide them to the game console or other platform; a data store for storage and retrieval of attributes associated with an NFT character; and one or more processors for executing requests from the game console or other platform. It can be appreciated that a web browser may not utilize certain function of the client platform, such as utilizing the server to access the blockchain, because a web browser has web3 compatibility and can natively access the blockchain. This alternative is depicted in FIG. 7, where the web browser can interact with the blockchain either directly or by server.

In an exemplary embodiment by the process shown in FIG. 4, the game console sends an HTTP request to Apache via an online connection and after the user has logged into the user platform. Apache generates a PHP request to execute NODE.JS, a javascript program which in turn accesses the blockchain to obtain the NFT characters, or alternatively a list of the NFT characters, owned by the user (i.e. within the user's associated digital wallet). The NFT characters, or a list of the NFT characters, are returned to the game console or other platform as a URL response, for example, in a .JSON file. In accordance with FIG. 5, a web browser may access the blockchain directly to obtain the NFT characters or a character listing, or may access the blockchain via the server.

In an embodiment, one or more of the game console or server may store a state of a user's digital wallet and execute computer readable instructions to compare the stored state to the user's digital wallet at a later time. A difference listing in the NFT characters owned may then alternatively be provided to the game console to reduce redundancies in transmitted information. In an embodiment, the NFT characters are downloaded from the blockchain at each relevant request. In an embodiment, the NFT characters are stored on the server or stored locally until the user no longer owns the NFT character due to, for example, a sale of the NFT character asset.

As noted, another aspect of the user platform is to store data associated with a user's NFT characters. For example, when a user plays a video game with one of the NFT characters, that character may gain experience, may "level up", etc. It should be noted that changing information such as metadata in an NFT is possible and that certain changing character attributes, for example experience, may be changed in the NFT. For example, in an embodiment, data or attributes of the NFT character may be stored directly on the blockchain. In some alternative embodiments, changing NFT data may be expensive in some cases due to gas fees and it may be economically advantageous to store such attributes outside of the blockchain. However, some blockchains have very low or no gas fees, and frequent interactions with the blockchain to update data or attributes associated with the NFT character are readily feasible. For the purposes of the present invention, such attributes or data may be stored directly on the blockchain, on another location such as the user platform or server, or on a combination of the blockchain and another location. Local storage of some or all attributes is also possible and contemplated.

Within the user platform, an NFT character's attributes (whether they are stored on the blockchain or on the server) are inseparable from the NFT character. Because of this, the NFT character is dynamic and increases in value as its attributes increase. The attributes, such as experience, may increase due to gaining experience by using the character in games, or by any other means. Due to the security of blockchain transactions, the user can securely benefit from their time investment in their character should they decide to sell their character.

Some game consoles (e.g. PlayStation) have limited permissions for loading external data, such as characters, into games. In some instances, it is possible for various permutations of characters to be hard-loaded into the game such that characters owned by the user can be accessed and used in-game. For examples, various textures, skins, skeletons, animations, etc. could be hard-loaded such that the console can generate any owned characters. Alternatively, libraries of pre-generated characters could be hard-loaded. In such embodiments, the blockchain is still an essential part of the system for confirming ownership of the character. For example, the game on the console may only allow for loading characters which are verified to be present in the user's digital wallet. On other devices, such as a web browser or different console, the same character may be imported without being natively loaded into the game. In this manner, the user platform provides for cross-platform play using NFT characters (or any other in-game assets) on the blockchain.

The user platform may also incorporate other NFT assets beyond NFT characters or other in-game assets. For example, the user may be able to access certain sound, video, or other files in-game through the user platform server (or directly from the blockchain in a web3 enabled browser or game engine). In some embodiments, NFT character augmentations may also be incorporated from a separate NFT (such as visual or skin augmentations, animation augmentations, or any other modifications to the base NFT character).

EXAMPLES

The following examples describe NFT characters (NFT+) in conjunction with the user platform. Two video games utilizing the user platform (alternatively referred to as Purposeverse) are exemplified, namely Bunny Raiders and Elementons.

In Bunny Raiders, a player may summon characters that assist them in battling in a two-dimensional overhead view. In this particular example, the NFT character does not gain experience in Bunny Raiders, but may be more powerful depending on its experience level in another game (Elementons). In Elementons, the player may engage in one-on-one battles of their NFT character with non-player characters (NPCs) or with other users' NFT characters. In any event, the act of battling gains experience for the NFT character. If the character wins the battle, then more experience is conferred compared to if the character loses the battle. The experience value (i.e. the XP value) is typically stored on the user platform such that other games, including Bunny Raiders, can access the XP value and modify the way the character interacts with the world around it accordingly. In alternative embodiments, the XP value, or other attributes, may be stored on the blockchain instead of on the user platform server. For instance, a character having a higher XP value may gain access to certain abilities or attacks in Elementons, and likewise may gain access to certain abilities or attacks in another game such as Bunny Raiders. In other embodiments, the NFT character may gain XP in more than one game, or may have other attributes which are shared across multiple games, such as health, level, levels of certain skills, attacks, speed, attack speed, defense, armor, mana/magic, etc.

Figure 8:
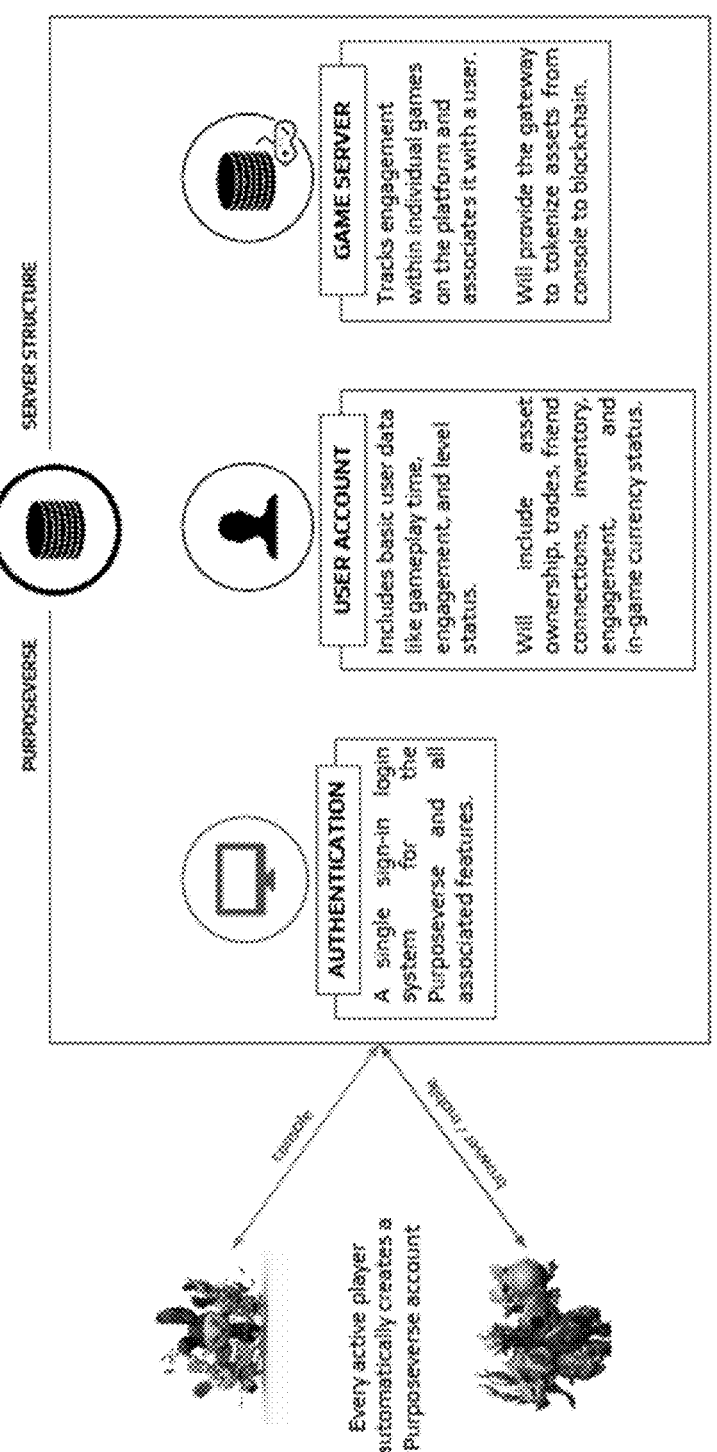
FIG. 8 shows an exemplary diagram for a user accessing
the user platform.

FIG. 8 depicts an example of accessing the user platform from a video game. In this example, Bunny Raiders is shown in connection with a console (i.e. Xbox, Playstation, etc) and Elementons is shown in connection with a browser/mobile device. If the user is a new user, then they would register for a user platform account (i.e. a user account) to create login credentials. If the user is not a new user and already has login credentials, then the user would log in from whichever game they are playing. The user platform is accessed from a single sign-in which uses the same credentials across all platforms and games compatible with the user platform. The login may also have authentication features such as two-step authentication, biometric authentication (such as fingerprint or facial recognition), etc.

Upon creation of the user account, or sometime prior to accessing NFT characters, the user will associate their user account with their digital wallet such that the user platform can access the digital wallet and obtain the user's NFT characters. The user account also includes basic user data like gameplay time, engagement, and level status. The user account may also include asset ownership, trades, friend connections, inventory, engagement, and in-game currency status. It should be appreciated that the asset ownership of the NFT characters is controlled by and documented on the blockchain, and that the user account may reflect that information in an accessible format. Other assets such as in-game assets may be stored on the user platform. The Game Server tracks engagement within individual games on the platform and associates it with a user. The Game Server also will, in some embodiments, provide the gateway to tokenize assets from a console or other platform to the blockchain.

Figure 9:
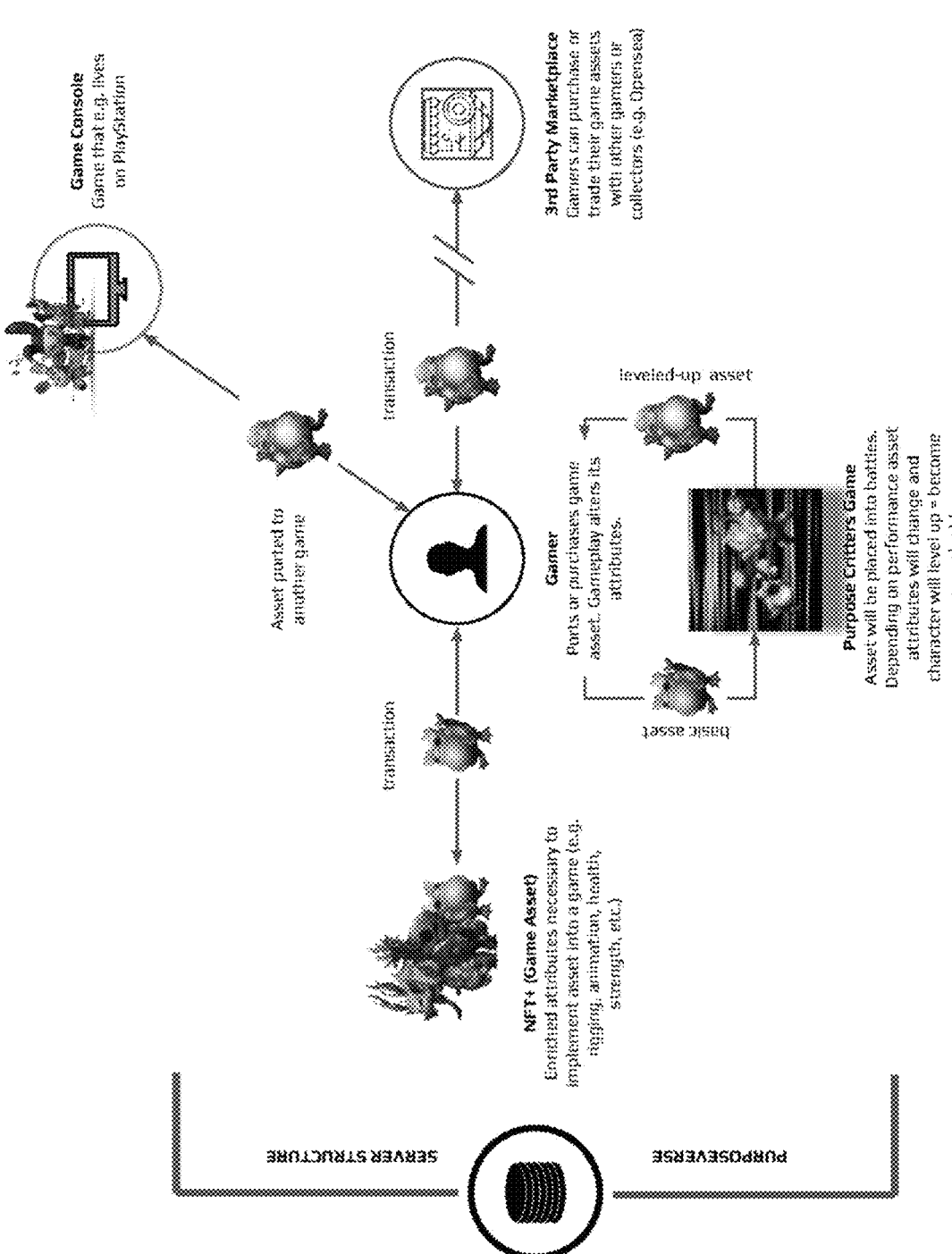
FIG. 9 shows an exemplary diagram for cross-platform
play with an NFT character.

FIG. 9 depicts an exemplary embodiment of taking an NFT character from one game to another. Beginning in Elementons (previously Purpose Critters), an NFT+ asset (i.e. the NFT character) is purchased by the gamer. As described herein, the asset will contain the skeletal structure, the skin, and animations/poses. The game will utilize "enriched attributes" to implement the asset into the game. Such enriched attributes include rigging, certain game-specific animations, health, strength, etc. In other words, the NFT+ defines how the character looks and how its skeletal structure moves, while the game defines how the character interacts with the game-specific world.

The gamer may play with the character (i.e. battle with the character in Elementons) to gain XP (experience points) or other attributes. In an embodiment, the XP is stored on the user platform and is associated with the NFT character. In another embodiment, XP or other data is stored on the blockchain along with the NFT character or associated with the NFT character. The character may then be "ported" into another game in which the user logs into with their user platform account. The other game (i.e. Bunny Raiders) will then utilize the character therein. If a higher XP value is associated with the character, then its abilities and attributes in Bunny Raiders may be better than those associated with an otherwise equivalent lower XP character. The user/gamer may decide to sell their character on a $3^{rd}$ party marketplace (e.g. Opensea). Because the user platform associates the XP value with the NFT character, the character may be more valuable to other gamers/collectors than an otherwise equivalent character with lower XP. When a gamer/collector buys an NFT character having associated XP, they will be able to utilize that character in the user platform with its associated XP, and will be able to continue to improve the character if they desire. In this manner, in an embodiment, the user platform ultimately relies upon the blockchain for ownership/transactions of NFT characters, but also maintains associated information, such as XP, in relationship with NFT characters. This aspect of NFT+ makes it dynamic in that the NFT value is determined by more than just the underlying asset value and changes based upon gameplay habits, all while utilizing the inherent security advantages of the blockchain.

In other embodiments, as described herein, the user platform may store information about an NFT character, such as the NFT character's ownership, experience level, games played with the character, time played, etc., but may ultimately rely upon the blockchain for any data or attributes which are stored on the blockchain. In this manner, in addition to data or attributes stored on the blockchain, the user platform may store other data, attributes, or important or interesting information associated with the NFT character. Or, alternatively, the user platform may store all data and attributes, including those stored on the blockchain, but may replace or update the user platform data and attributes if the data and attributes on the blockchain are updated. In this manner, in some embodiments, the blockchain is the primary source of data and the user platform may archive or supplement the blockchain data.

Figure 10:
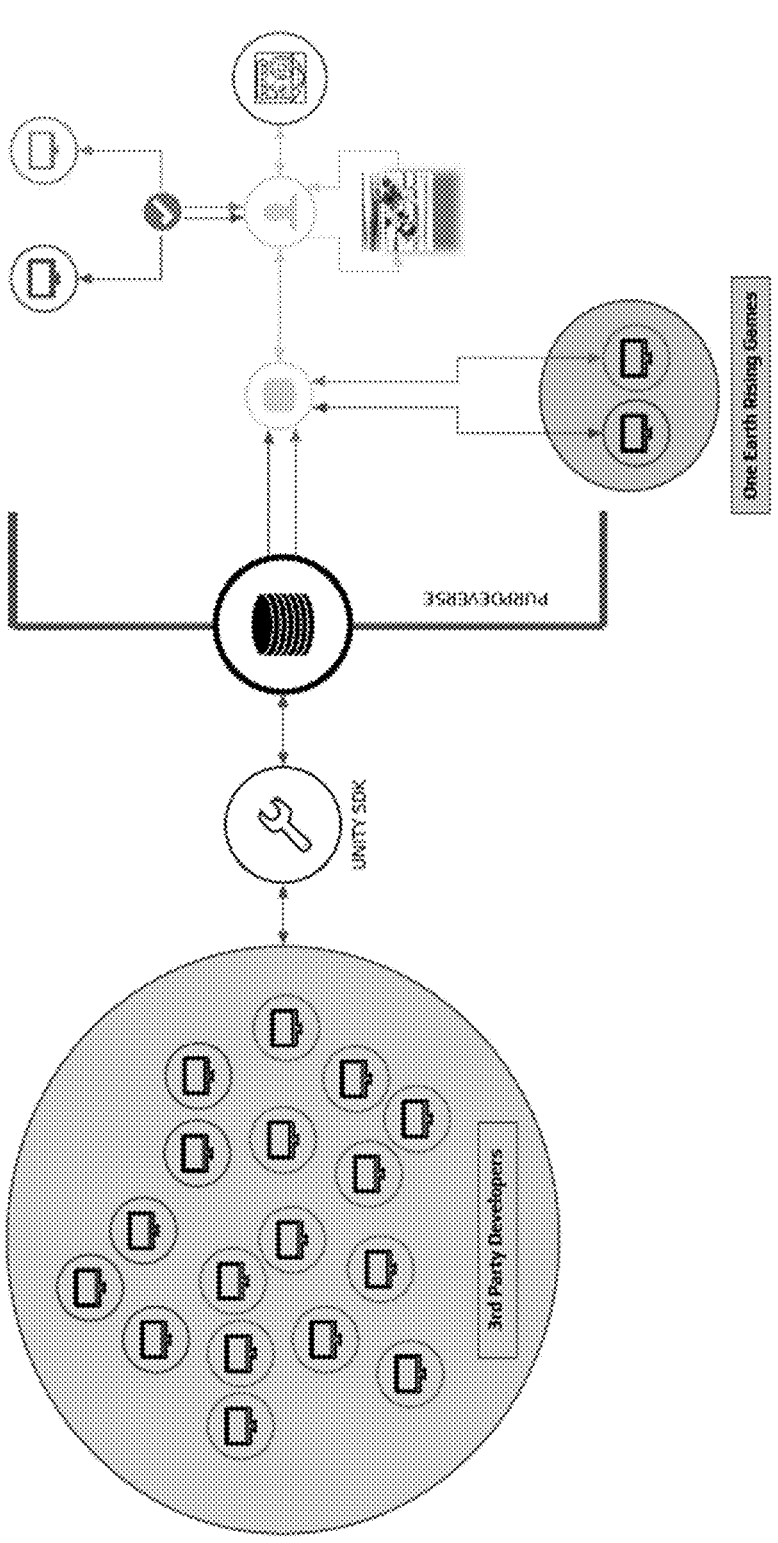
FIG. 10 shows an exemplary diagram for 3$^{rd}$-party devel-
oper input.
Figure 11:
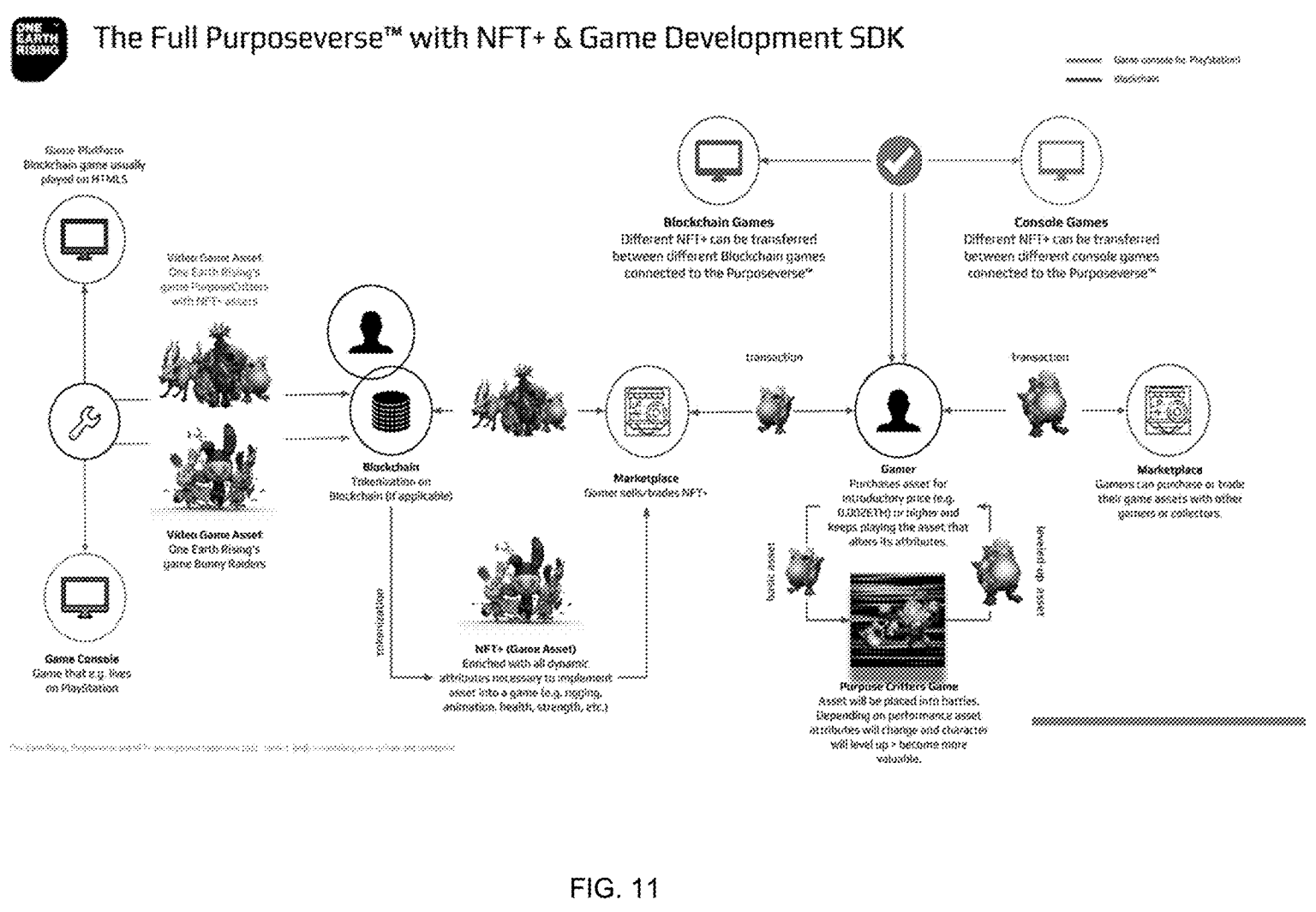

As depicted in FIG. 10, the user platform may be opened to $3^{rd}$ party developers. For example, $3^{rd}$ party developers utilizing the Unity software development kit (SDK) may develop their games for compatibility with the user platform. This will enable the $3^{rd}$-party developed games to utilize a user's NFT characters, including their attributes. FIG. 11 shows an overall exemplary depiction of the cross-platform compatibility of user platform games on game consoles and blockchain games, such as those usually played on HTML5.

Figure 12:
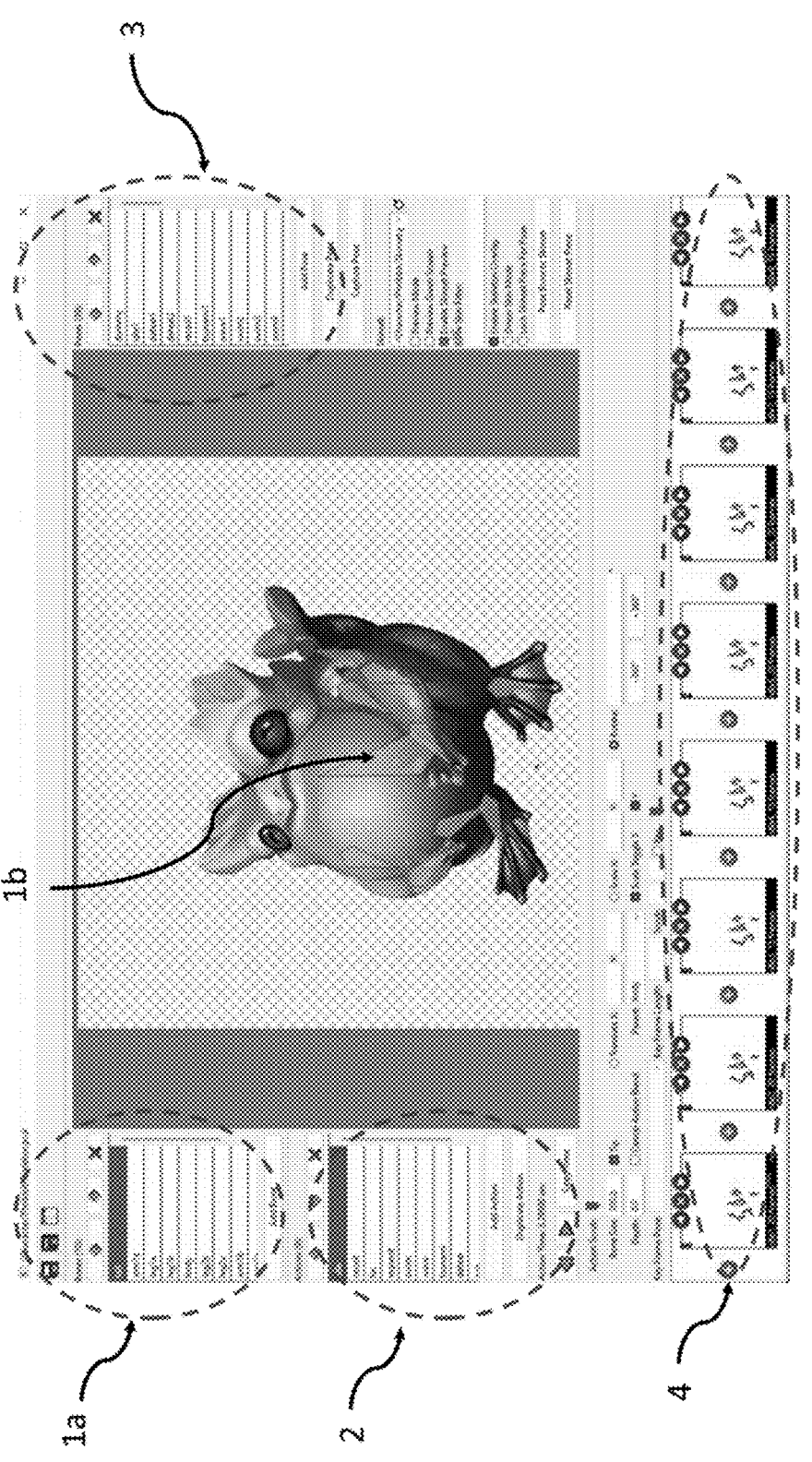
FIG. 12 shows an exemplary skeleton and skin.

An example of a character skeleton is provided in FIG. 12, although it can be appreciated that various aspects of the skeleton concept may vary greatly depending upon the exact implementation. In the particular 2D embodiment exemplified, the character has 10 "bones" representing portions of the skeleton which can move independently from one another. The bones are listed in 1a and depicted pictorially as 1b. The bones assume various poses 3 (such as idle, stun, etc.) or may be manipulated according to certain actions 2 (such as idle, walk, run, attack, etc.). The selected action has various keyframes that depict positions for manipulations of the bones 1a, 1b.

The skeleton is associated with a skinset (i.e. skins) which are portions of a character mapped to the various bones of the skeleton. In this manner, a single skeleton to, for example, a frog-like character (FIG. 3) may be modified with different skins (e.g. FIG. 1, FIG. 2) to define characters of different rarity and value. Advantageously, as described herein, the skeleton, skin, and animations (including actions and poses) may be incorporated into the NFT character in an image file such as a .PNG file, to securely mint the character as a blockchain asset.

Figure 13:
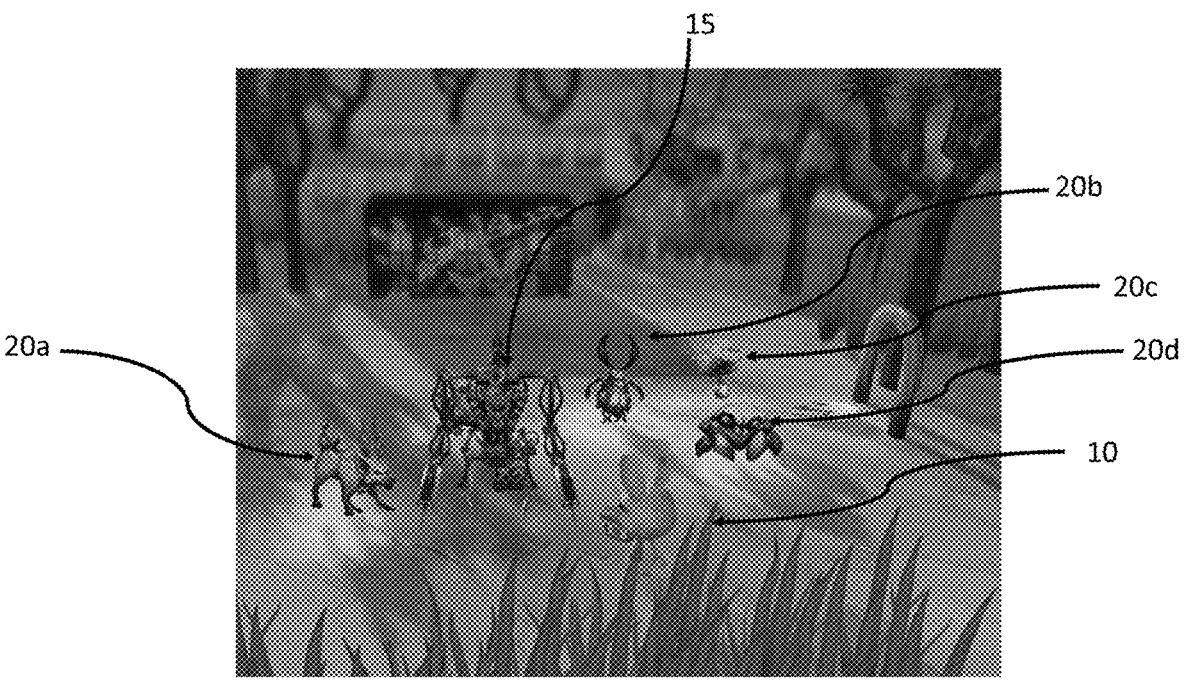
FIG. 13 shows an exemplary in-game scene with NFT
characters present.

FIG. 13 depicts an exemplary screenshot of gameplay in Bunny Raiders. In the screenshot, 6 characters are shown labeled, with a seventh character being obscured from view behind the robot character 15. Two of the characters, the bunny 10 and the robot 15, are native to the video game and are compiled into the game. The other four labeled characters are NFT characters 20a-20d, which are not natively compiled into the game but are accessible from the blockchain by the gamer's user account login and associated digital wallet. In the screenshot shown, each aspect of their appearance is provided by the image file (PNG file) on the blockchain. While not visible in the still screenshot, the characters 20a-20d are all each undergoing some degree of movement in accordance with their idle animation, which is provided by the PNG image file.

Figure 14A:
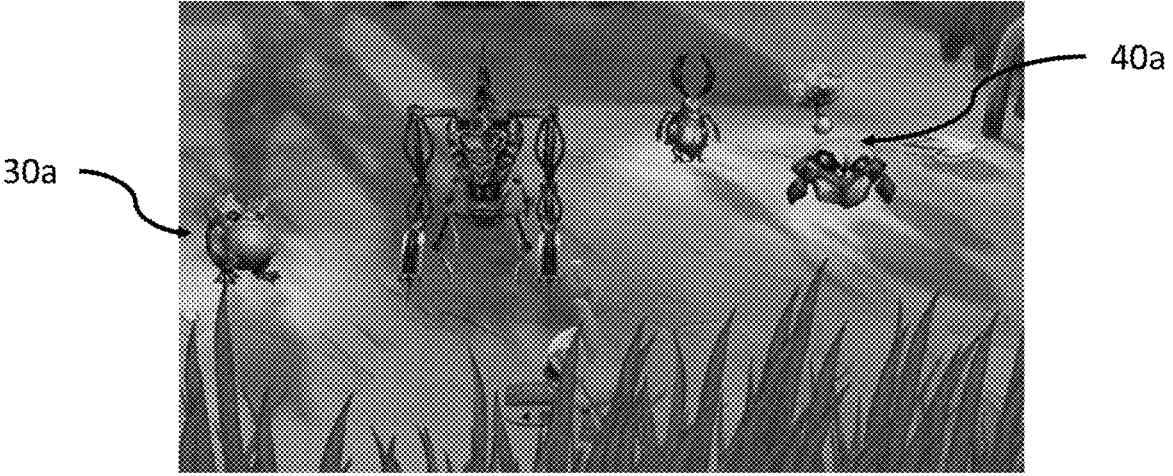
FIG. 14A shows an exemplary in-game scene with NFT
characters in an idle animation state.
Figure 14B:
FIG. 14B shows an exemplary in-game scene with one
NFT character in an attacking animation state while other
NFT characters remain idle.

An example of character animations are shown in FIGS. 14A and 14B. in FIG. 14A, the frog-like character 30a is in an idle state, meaning that it is performing its idle animation, which is one of its animations defined by its originating PNG file. At the same time in FIG. 14A, the crab-like character 40a is performing its idle animation. In accordance with the gameplay, the frog-like character changes from idle 30a to attacking in FIG. 14B. The movement of the character's skeleton is dictated by the attack animation 30b defined by its originating PNG file. The animation of the bubbles generated by the attacking character 30b is compiled into the video game, along with the effects that the attack has on opponents. As previously noted, the user platform may contain an experience level or other attribute tied to the NFT character, and such experience levels may affect certain aspects including attack speed, damage, etc. At the same time in FIG. 14B, the crab-like character remains in its idle state because it has not been instructed to attack. It can be seen that idle state 40a is different from idle state 40b, because the character is under repeated movement in its idle state, as defined by the underlying PNG NFT data file.

Figure 15:
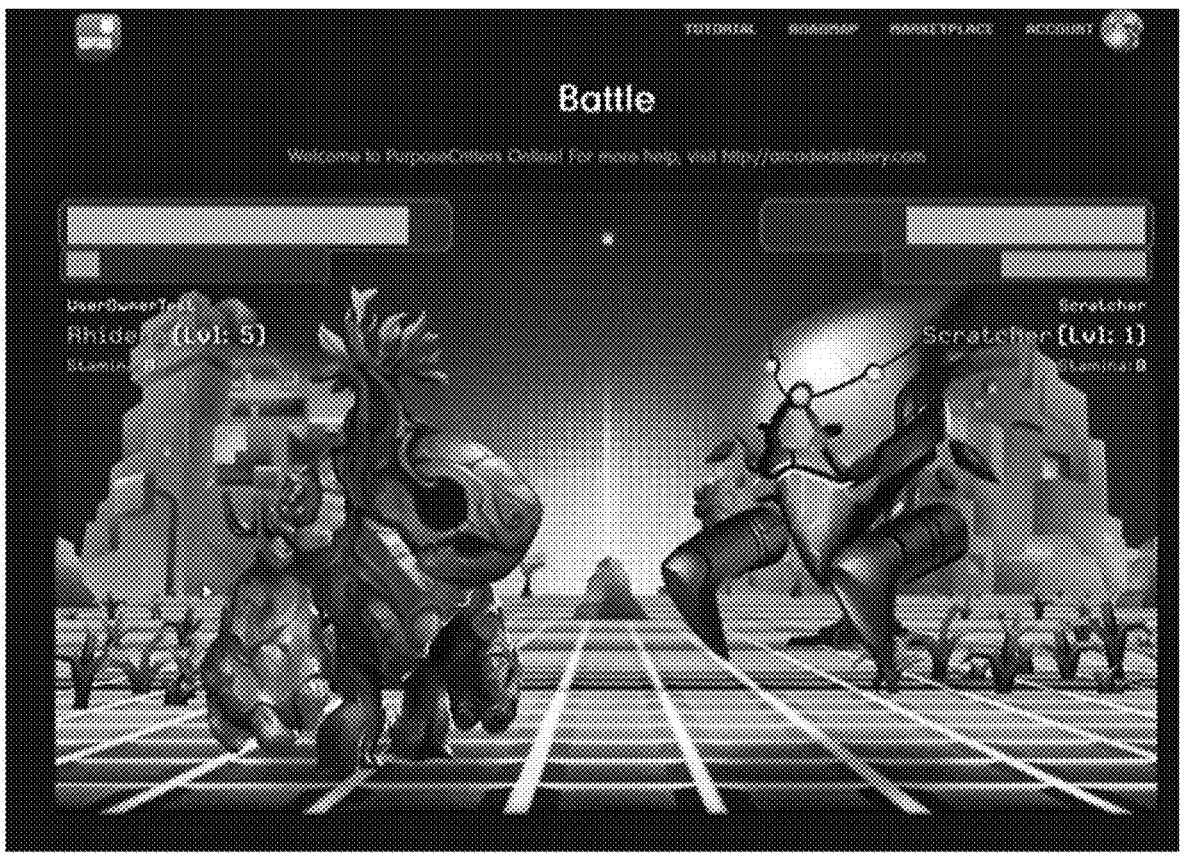
FIG. 15 shows an exemplary in-game scene from a battle
game with an NFT character present.

FIG. 15 shows a still of a battle game (e.g. Elementons, Purpose Critter). The NFT character from the blockchain may be utilized in the battle game to fight against NPC characters, or against other uses of the user platform The NFT character may gain experience from each battle, for example more experience if the character wins the battle compared to if the character loses the battle, and the experience gained may be stored on the user platform server as described herein as an attribute associated with the NFT character, or alternatively may be stored on the blockchain. After gaining experience in the battle game, the character may have a higher value in the marketplace because of its increased attributes. Likewise, should the player decide to utilize the NFT character in another game such as Bunny Raiders, the experience may carry over and may enhance the character in the other game. The battle game and/or bunny raiders may be played on multiple consoles such that a user may play one or both games on a mobile phone, console, or web browser (as non-limiting examples). Therefore, the player experiences a cross-platform experience where their NFT character may be utilized in a plurality of games running on a plurality of different devices. It can be appreciated that two games have been described in the foregoing as an example, but the NFT characters may be utilized in any number of user platform-enabled games. Furthermore, attributes such as experience points may be gained in any number of games and are not limited to being gained only in a battle game.

Figure 16:
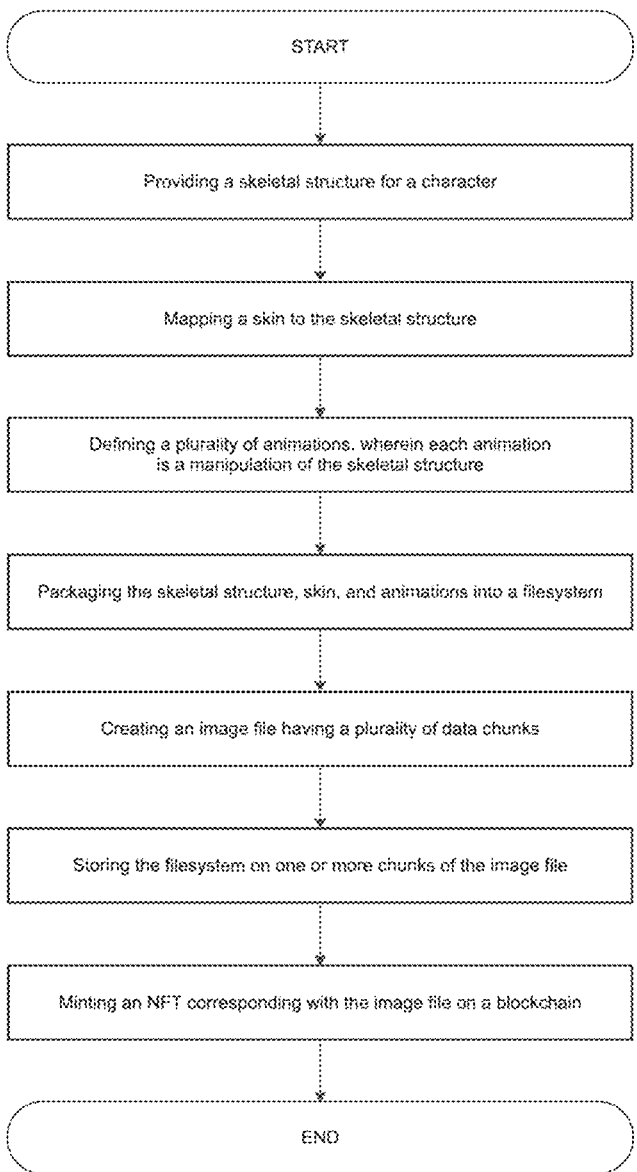
FIG. 16 shows an exemplary method for providing an
NFT character on a blockchain.

In further embodiments, as depicted in, e.g., FIG. 16, provided for are exemplary methods for providing an NFT character on a blockchain. Said methods may generally follow any useful ordering of various steps provided that an NFT character is accessibly stored on a blockchain. Methods may include one or more of: providing a skeletal structure for a character; mapping a skin to the skeletal structure; defining a plurality of animations, wherein each animation is a manipulation of the skeletal structure; packaging the skeletal structure, skin, and animations into a filesystem; creating an image file having a plurality of data chunks; storing the filesystem on one or more chunks of the image file; and minting an NFT corresponding with the image file on a blockchain. For example, the image file may advantageously be a PNG file as described herein, or may be any other blockchain-storable file capable of storing an NFT character. The NFT character may be stored as a smart contract with the image file stored at another decentralized location or, alternatively, the entire NFT character (i.e. any smart contract and the image file) may be stored on the blockchain. In an embodiment, at least one portion of the filesystem is stored on the blockchain.

Figure 17:
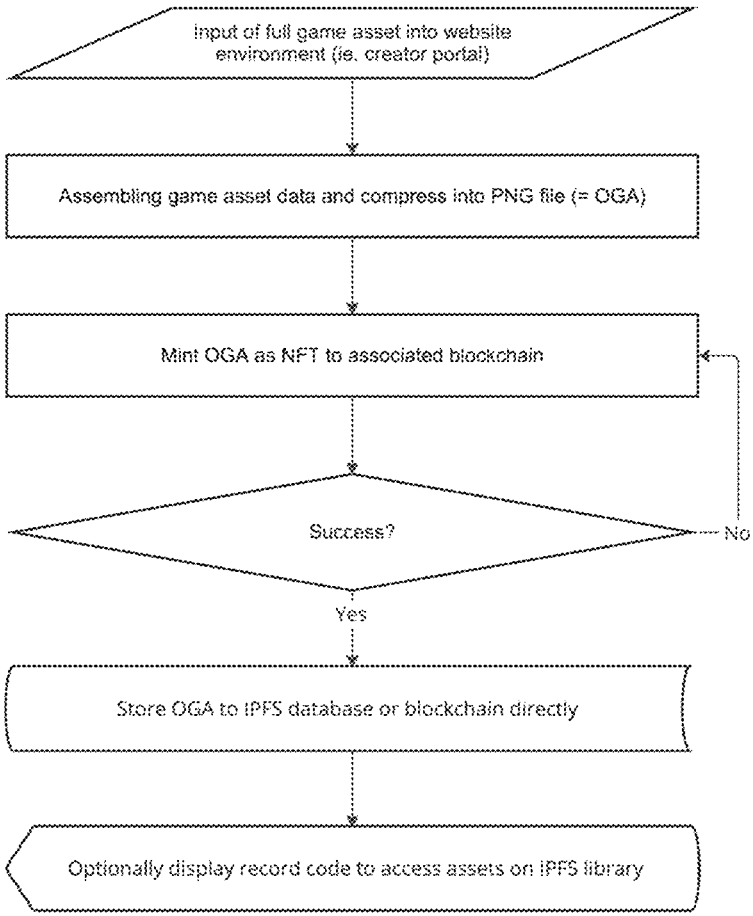
FIG. 17 shows an exemplary embodiment for storing an
ownable game asset (OGA) on a blockchain.

In further embodiments, as shown in FIG. 17, provided for are further methods and systems for storing an ownable game asset (OGA) on a blockchain. For example, a creator portal may be provided in an environment, including a website browser, graphical user interface, or other interface. In an embodiment, the creator portal allows for the creation of an NFT character (i.e. creation of, for example, skeletal structure, skin creation and mapping, animation, etc.). In an embodiment, the creator portal allows for importing aspects of the NFT character created in other programs or environments. The creator portal generally allows for assembling the game asset data (i.e. the NFT character data) for compression into an image file, including but not limited to a PNG file. The compression to an image file may include storing the game asset data on one or more filesystems and storing the one or more filesystems on one or more data chunks of the image file. The creator portal may therefore output an image file, such as PNG file, which may be stored on a blockchain. The creator portal or another program including but not limited to a blockchain interface then be used to mint the OGA as an NFT on a chosen blockchain. In some embodiments, the OGA is stored in an IPFS database. In some embodiments, the OGA is stored on the blockchain directly. Optionally, the creator portal may display record code to access assets on an IPFS library, if the OGA is stored in an IPFS database.

Figure 18:
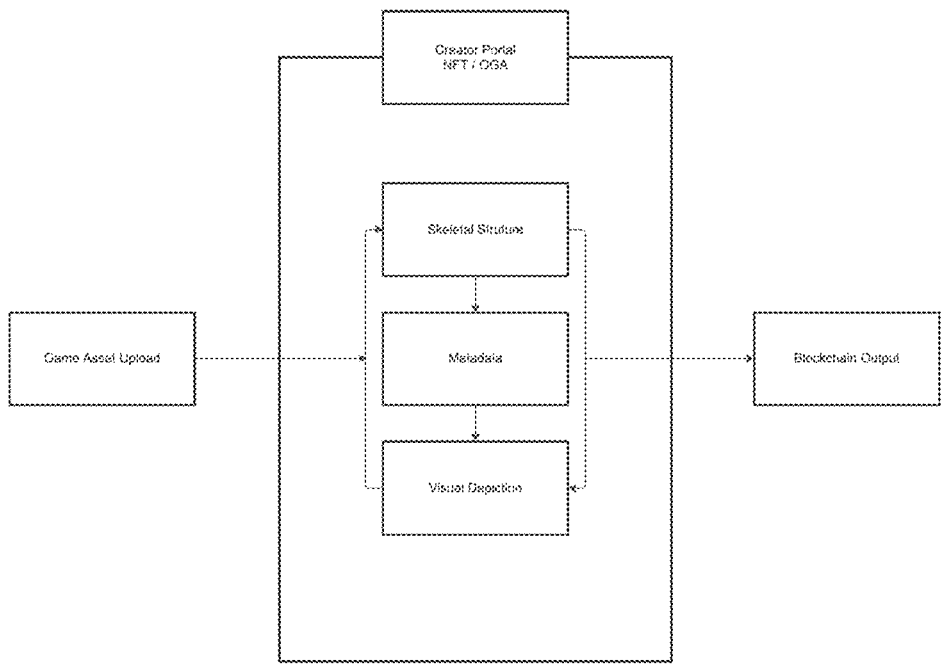
FIG. 18 shows an exemplary system for creating an
OGA/NFT by a creator portal.

FIG. 18 is another exemplary depiction of a creator portal embodiment. The creator portal generally allows for input of game asset data, generation of an NFT character or OGA, and blockchain output as described herein. A user of the creator portal may develop OGA's by building or altering skeletal structures, metadata, or visual depiction of the OGA. For example, the skeletal structures may be animated, and one or more skins are generally added to the skeletal structure to change the appearance of the OGA. A user may generally iterate through various OGA aspects until they arrive at a final OGA which they wish to mint on the blockchain. The creator portal may then allow for minting and outputting the OGA to the blockchain where it will be stored as a usable, and valuable, asset.

Figure 19:
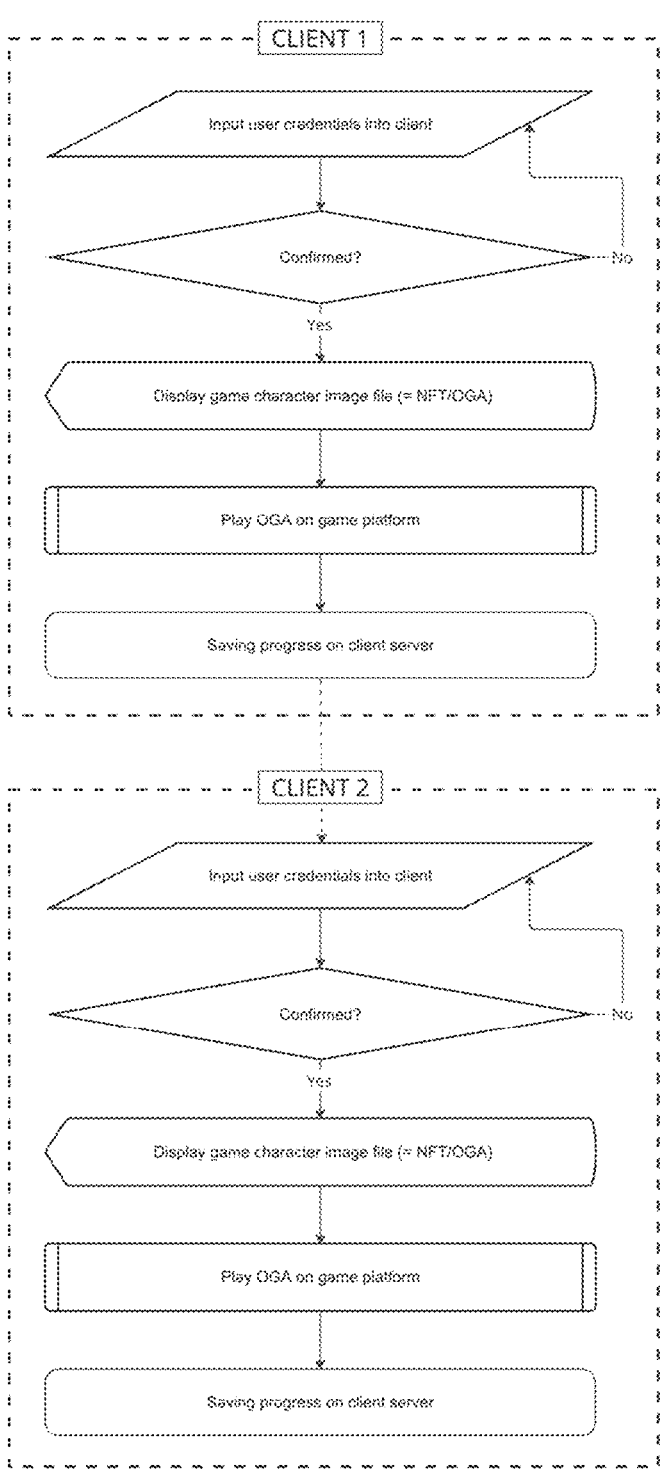
FIG. 19 shows an exemplary embodiment for cross-
platform use of an NFT/OGA on two different clients.

The OGAs are generally useful in various client platforms. For example, as shown in FIG. 19, an OGA may be used in both a first and second client. In an embodiment, each client is required only to be in operable communication with a blockchain to access the OGA. Typically, this involves some manner by which to determine which assets the user of the client platform owns. In an embodiment, as described herein, a user platform may be utilized with which the user has a user account. The user will typically access the user account using credentials (including one or more of username, password, biometric authentication, two-factor authentication, etc.). Once the login is confirmed, the user platform will be accessible by the client platform with respect to the user's account. The user platform will generally contain the necessary information for the client to access the user's OGA assets. In an embodiment, the user will be able to browse their OGA assets by a displayed game character image file. The image file may include a static image of the character or, alternatively, an OGA may be animated by the client. The user will then have the option to select one or more OGA's for use on the client game platform. On that particular game platform, the user may have some in-game progress with the character and wish to save that progress for the next time they play. In an embodiment, progress is saved on the client server associated with the game platform. In an alternative embodiment, one or more aspects or attributes may be saved on the user platform, such as experience points or level, time played, etc., for use by another client platform. In yet another alternative embodiment, one or more aspects or attributes may be saved on the blockchain for use by another client platform.

Figure 20:
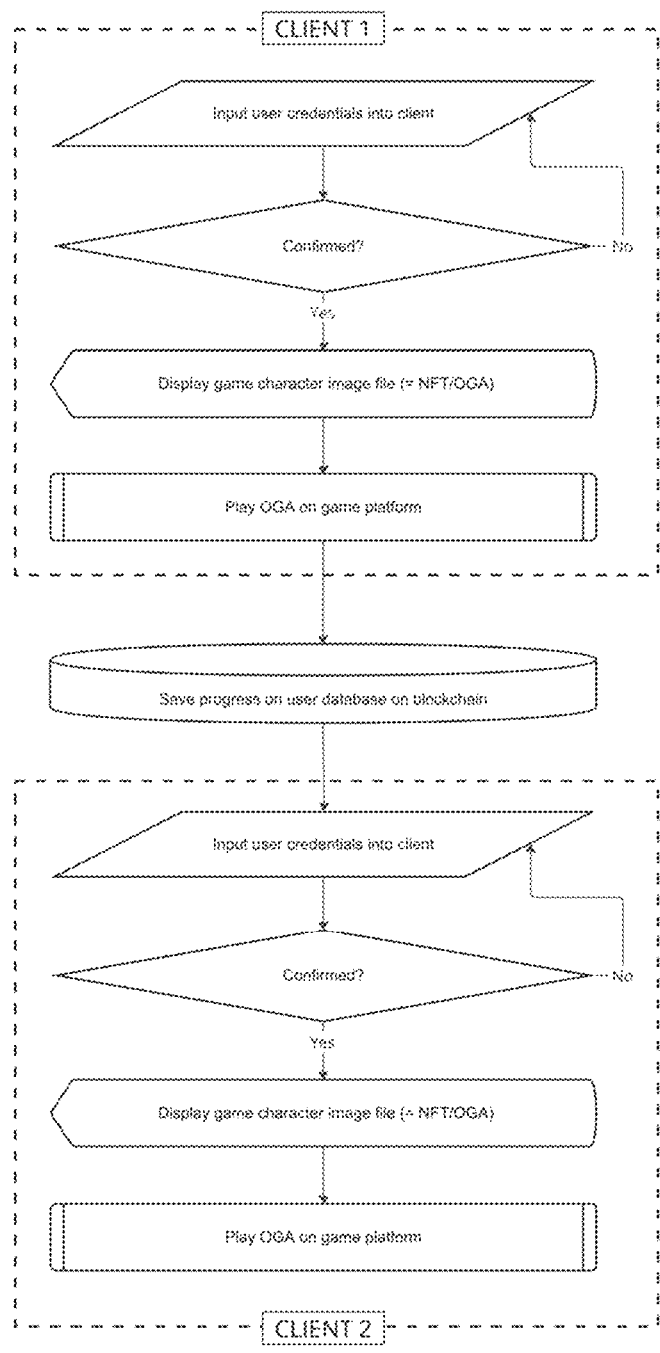
FIG. 20 shows an exemplary embodiment for cross-
platform use of an NFT/OGA on two different clients
including saving progress or another aspect associated with
the NFT/OGA on a blockchain, whereby play on the second
client includes the progress or aspect incurred by play on the
first client.

In an alternative embodiment, as depicted in FIG. 20, in-game progress may be saved on a user database on a blockchain. For example, this may be particularly advantageous if a second client can use the stored progress on another game platform. In this manner, certain aspects of gameplay may become permanently associated with the OGA, thereby increasing its value and providing the user with a rich cross-platform gaming experience.

It can be appreciated that while the preceding examples are generally and advantageously within the field of gaming, that the disclosure is not limited only to video game embodiments. For example, a user may wish to use an avatar character across various social media or metaverse platforms. In a particular example, a user may generate an avatar that has associated attributes including number of views, interactions, followers (historic, cumulative, or current), subscribers (historic, cumulative, or current), number of comments or likes, or any other useful attribute. As described herein, attributes may be stored in a distributed location (such as IPFS) or on a blockchain. By doing so, an avatar may be a unique asset which has associated value for impact such as in advertising, influencing, or other social media or metaverse activities. Therefore, various further embodiments within the scope and spirit of the present disclosure are generally contemplated.

We claim:

1. A method of providing a character as a non-fungible token (NFT) comprising:
   providing a skeletal structure for a character;
   mapping a skin to the skeletal structure;
   defining a plurality of animations, wherein each animation is a manipulation of the skeletal structure;
   packaging the skeletal structure, skin, and animations into a filesystem;
   creating an image file having a plurality of data chunks;
   storing the filesystem on one or more chunks of the image file; and
   minting an NFT corresponding with the image file on a blockchain.

2. The method of claim 1 further comprising storing a static image of the character in the image file.

3. The method of claim 2 wherein the static image is displayed when the image file is opened in a photo viewer.

4. The method of claim 1 wherein the image file is a PNG file.

5. The method of claim 1, wherein the image file is a TIFF, bitmap, JPEG, GIF, EPS, RAW, raster, or vector image file.

6. A method of providing a character as a non-fungible token (NFT) comprising:
   packaging a skeletal structure of the character, a skin associated with the skeletal structure, and animations of the skeletal structure into a filesystem;
   storing the filesystem on one or more chunks of an image file; and
   minting an NFT corresponding with the image file on a blockchain.

7. A system comprising:
   a blockchain,
   an image file minted on the blockchain as a non-fungible token (NFT) comprising:
      a plurality of data chunks;
      a filesystem stored on one or more of the plurality of data chunks, wherein the filesystem comprises a skeletal structure of an NFT character, a skin associated with the skeletal structure, and animations of the skeletal structure; and
      a static image of the NFT character, and
   a client interfaced with the blockchain.

8. The system of claim 7, wherein the client is a web browser, mobile device, or video game console.

9. The system of claim 8, wherein the client is a video game console and wherein the system further comprises a server.

10. The system of claim 9, wherein the server accepts an HTTP request from the video game console and executes computer readable instructions to retrieve the image file minted on the blockchain.

11. The system of claim 7, wherein the image file is a PNG.

12. A system for cross-platform use of a playable non-fungible token (NFT) character comprising:
   a first client program operating on a first client;
   a second client program operating on a second client;
   a server in communication with the first and second clients and a blockchain;
   the playable NFT character stored within a PNG image file, the image file corresponding to an NFT minted on the blockchain;

wherein the playable NFT character is usable in each of the first and second client programs.

13. The system of claim 12, wherein the first and second clients are each independently selected from a video game console, a mobile device, and a computer browser.

14. The system of claim 12, wherein the first and second clients are the same, or different.

15. A system for cross-platform use of a playable non-fungible token (NFT) character comprising:
   a first client program operating on a first client;
   a second client program operating on a second client;
   the playable NFT character stored within an image file, the NFT stored in a user's digital wallet, and the image file corresponding to an NFT minted on a blockchain; and
   a server comprising:
      a data store comprising:
         login credentials for a user;
         an association between the login credentials and the user's digital wallet; and
         computer readable instructions for obtaining the image file containing the playable NFT character from the blockchain in response to a request from the first or second clients; and
      a processor for executing the computer readable instructions,
   wherein the playable NFT character obtained from the blockchain is usable in each of the first and second video client programs.

16. The system of claim 15, wherein the data store further comprises authentication logic executable by the processor for authenticating the user login on each of the first and second clients.

17. The system of claim 15, wherein the data store further comprises a stored server copy of the image file containing the playable NFT character and/or one or more pieces of stored data specific to the playable NFT character, selected from an attribute, an experience (XP) level, and transaction history.

18. The system of claim 15, wherein the first and second clients are each independently selected from a video game console, a mobile device, and a computer browser.

19. A method for cross-platform use of a playable non-fungible token (NFT) character comprising:
   accessing a blockchain-enabled server by inputting user credentials at a first client;
   receiving, from a blockchain or the blockchain-enabled server, an image file containing the playable NFT character;
   incorporating the playable NFT character in a first client program running on the first client;
   accessing a blockchain-enabled server by inputting user credentials at a second client;
   receiving, from a blockchain or the blockchain-enabled server, the image file containing the playable NFT character; and
   incorporating the playable NFT character in a second client program running on the second client.

20. A method for cross-platform use of a playable non-fungible token (NFT) character comprising:
   accessing a blockchain-enabled server by inputting user credentials at a first client;
   receiving, from a blockchain or from the blockchain-enabled server, an image file containing the playable NFT character;
   loading one or more NFT character attributes from the server or blockchain;

incorporating the playable NFT character in a first client program running on the first client, whereby one or more of the NFT character attributes are updated;

saving one or more updated NFT character attributes to the server or blockchain; 5 accessing a blockchain-enabled server by inputting user credentials at a second client;

receiving, from a blockchain or from the blockchain-enabled server, the image file containing the playable NFT character; 10 loading the one or more updated NFT character attributes from the server or blockchain; and incorporating the playable NFT character and updated NFT character attributes in a second client program running on the second client. 15

* * * * *